Patented Mar. 28, 1939

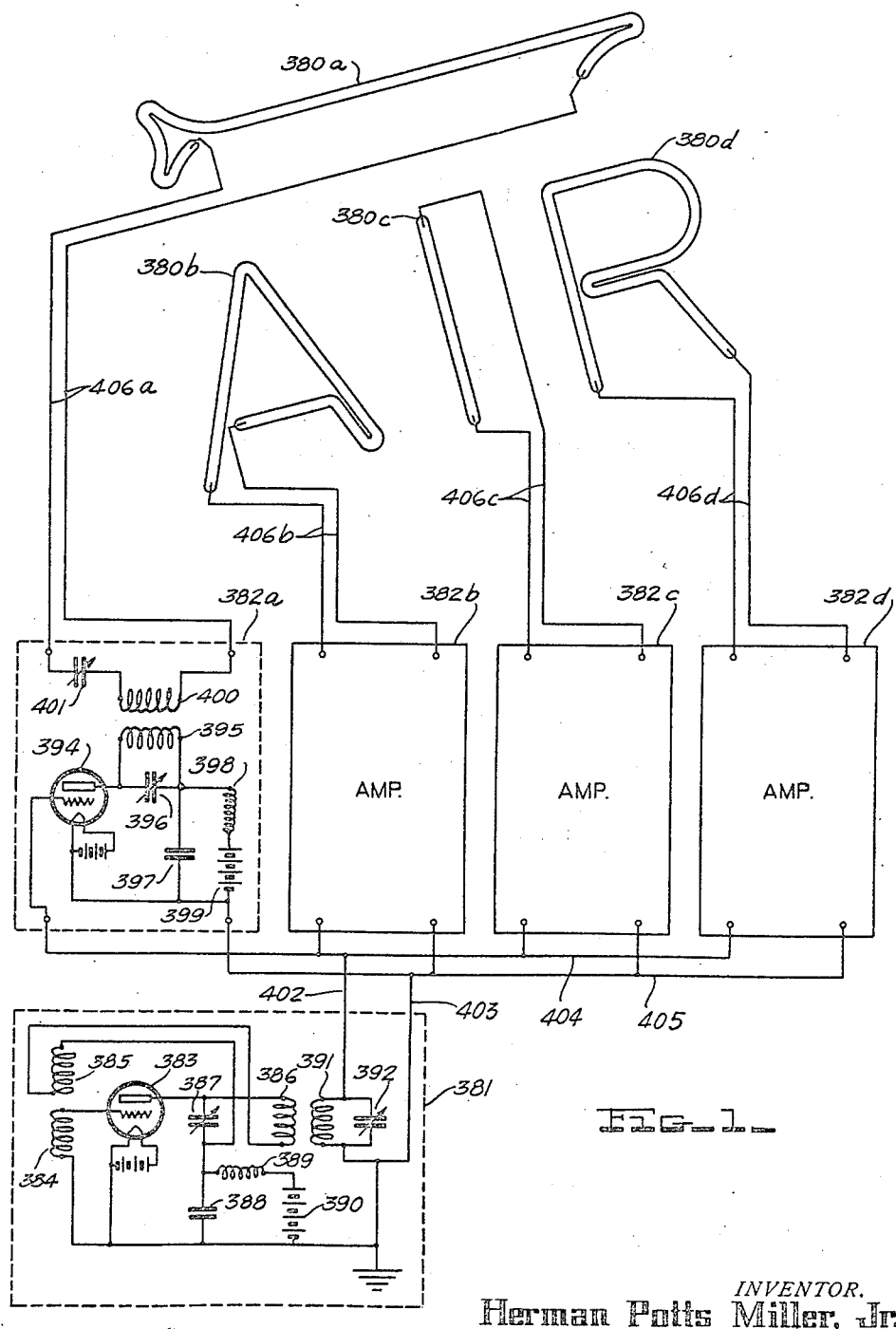

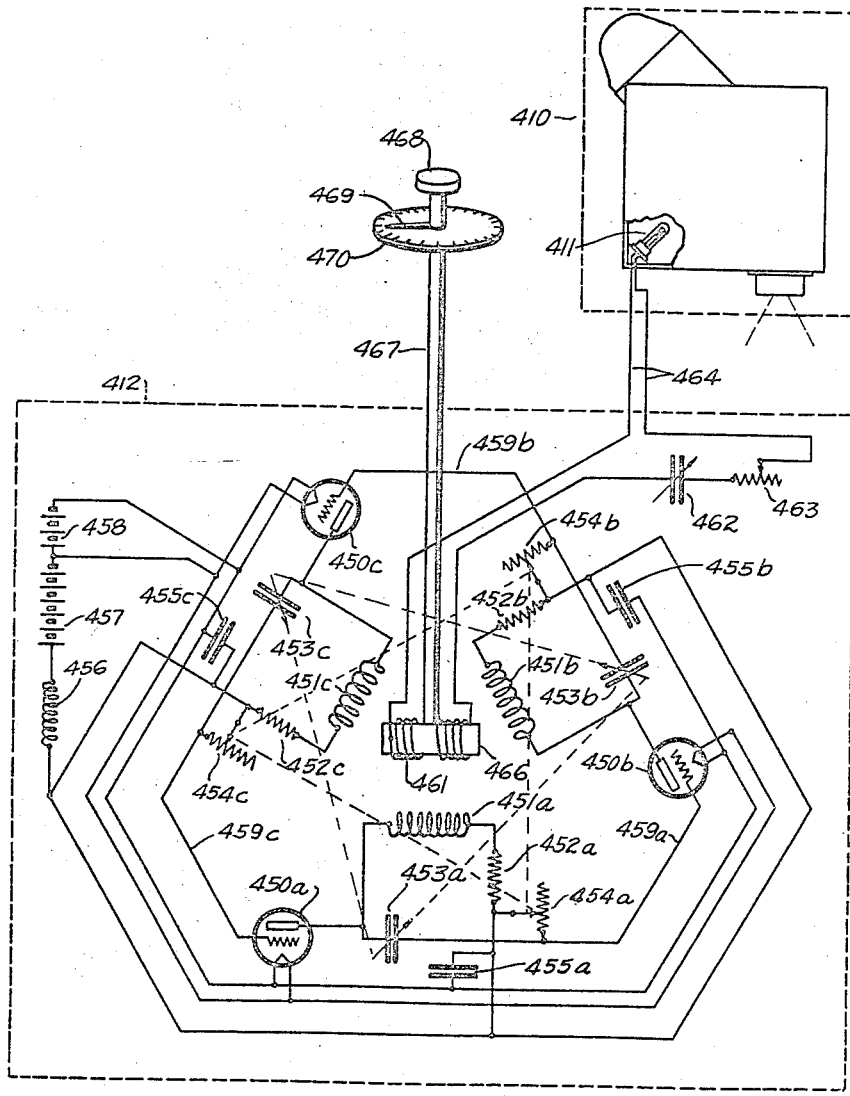
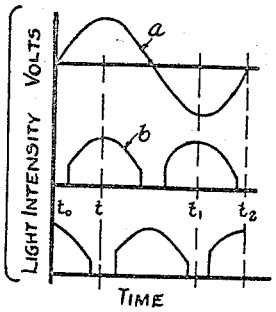

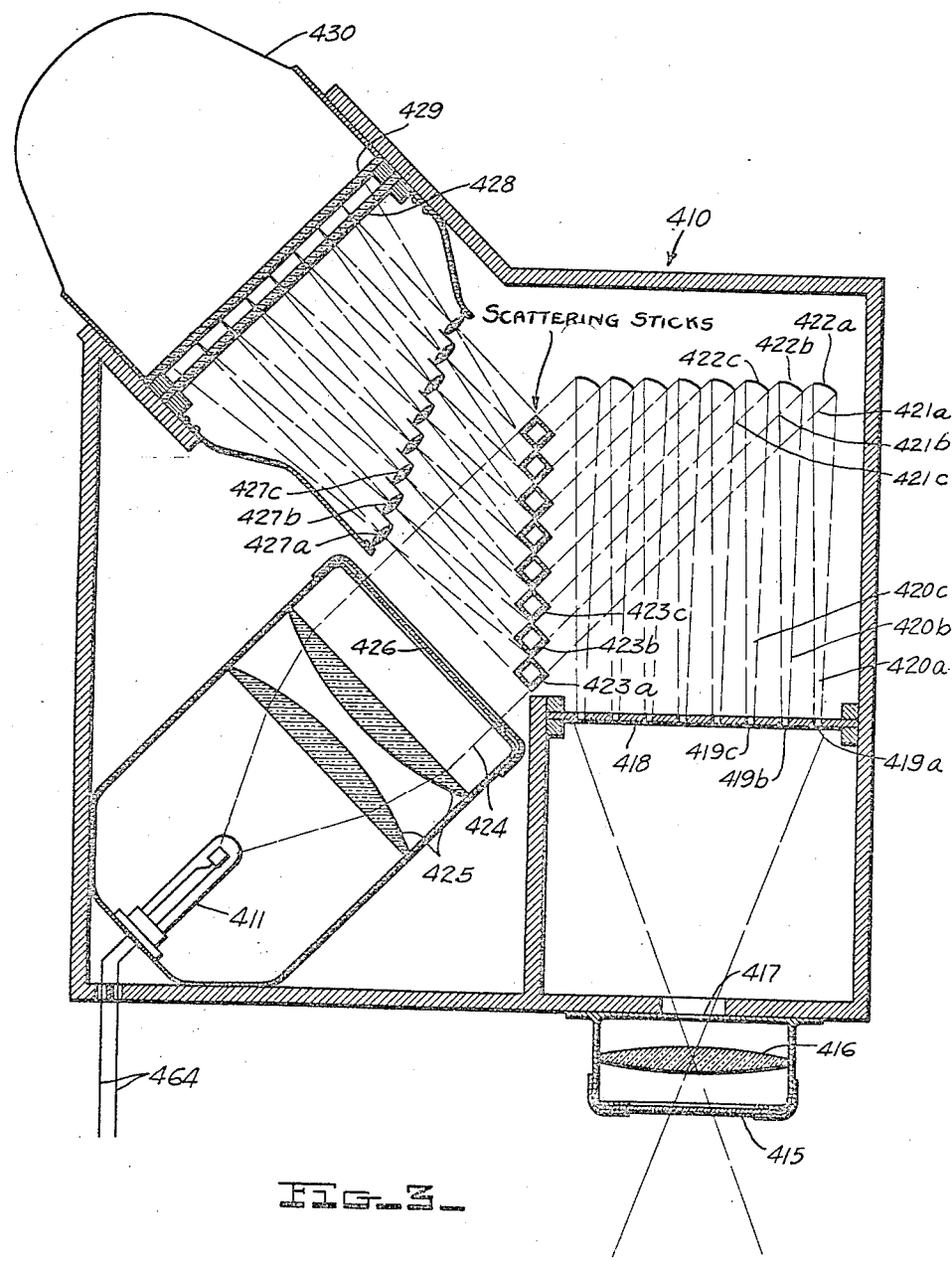

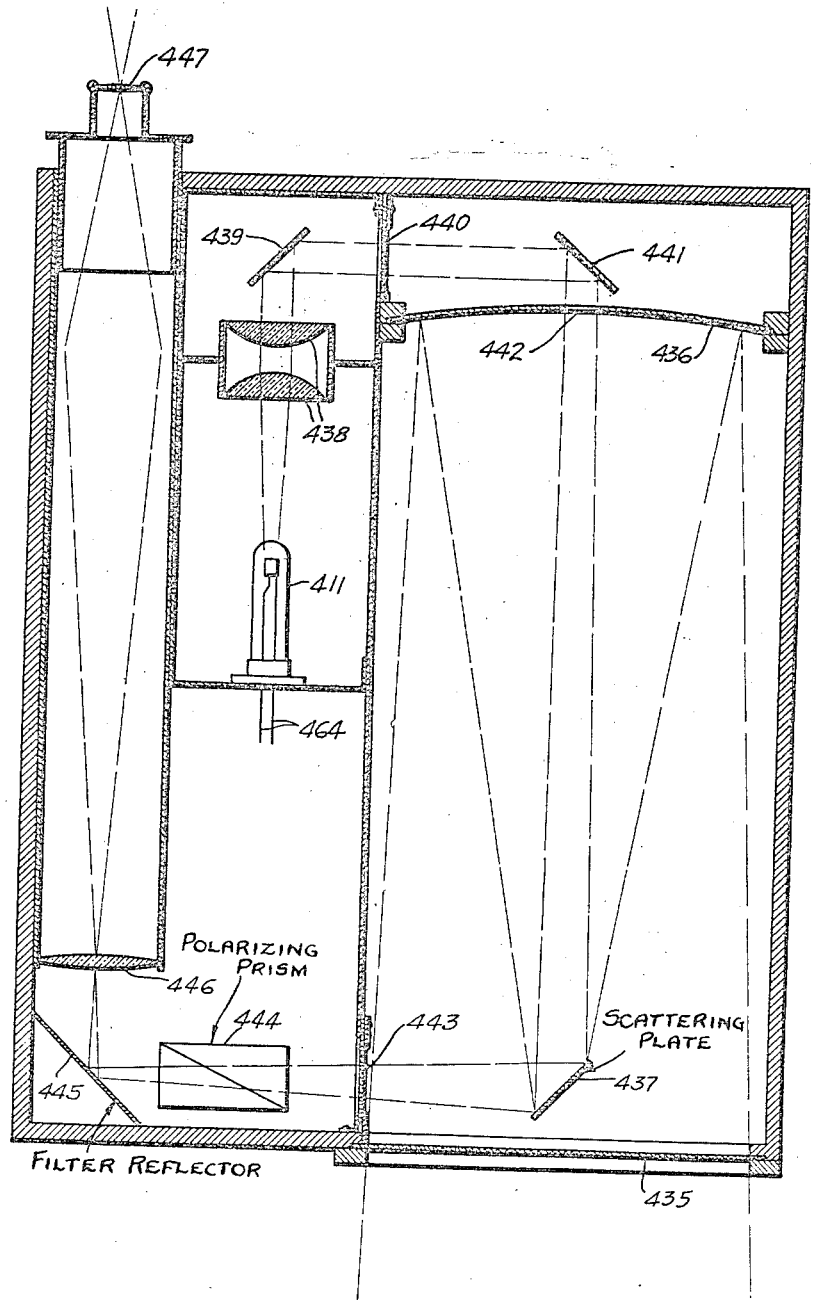

2,152,202

UNITED STATES PATENT OFFICE 2,152,202

INVISIBLE LIGHT FINDER

Herman Potts Miller, Jr., Harrisburg, Pa.

Original application September 12, 1931, Serial No. 562,590. Divided and this application January 27, 1936, Serial No. 60,988

32 Claims. (Cl. 250—1)

The present invention relates to a method of and means for translating invisible light patterns into visible light patterns. This application is a division of application Serial No. 562,590 filed September 12, 1931, Patent Number 2,032,588, granted March 3, 1936.

In navigating craft on land, sea, or in the air it is essential for the navigator to be able at all times to observe his position relative to other objects. The automobile driver must see approaching vehicles and obstructions along the highway; the ship pilot must see other water craft and objects along a nearby shore; while the aviator must see other aircraft and the location of landing fields. Under normal conditions the light waves which are visible to the eye may be employed for observation, but in times of dense fog or adverse atmospheric conditions these waves are only visible for short distances. It is known that waves above the visible spectrum, such as the infra-red waves, are readily transmitted through fog. Such waves to be usable must be quickly and efficiently translated into visible waves. The means hitherto available for this purpose have been suitable for translating only the shortest infra-red waves which do not readily penetrate fog. The present invention provides a method for translating longer infra-red waves which do penetrate fog.

The invisible waves to be translated may be either unintentional, such as the heat waves given off by persons, animals, water craft, or aircraft, or they may be special light sources controlled in the manner to be described hereinafter. The latter are the preferred type in this invention since they permit greater translation efficiency and provide means for measuring the distance between the wave source and the observing station, or the change in this distance. While the invention is especially applicable for use on aircraft and the embodiments to be described are suitable for such use, it is to be understood that similar embodiments may be employed on other types of craft.

An object of this invention is to provide a finder for viewing invisible objects.

Another object of this invention is to obtain a visible light pattern of invisible wave sources.

A further object of this invention is to provide a device for measuring the distance from the device to a light source.

A still further object of this invention is to provide a distance determining device with an infra-red finder.

A still further object of this invention is to provide a device for assisting an airplane in landing on an obscured field including an invisible wave finder and an altimeter.

The method employed in translating the invisible waves into visible waves is fully disclosed in the application of which this application is a division. In brief, it comprises projecting light waves of a particular frequency, either visible or invisible, from a local light source onto a light scattering medium. A part of these waves are scattered with change in frequency giving a second light frequency in the visible spectrum. Wave impulses from the invisible source, which are to be translated, are also projected onto the scattering medium and their effect on the medium is to increase the intensity of the second and visible frequency forming a pattern or image. By providing means for observing this pattern and the intensity variation thereof the pattern of the invisible light source itself may be seen and variations in intensity of the invisible source are indicated.

The novel features that I consider characteristic of my invention are set forth with particularity in the appended claims. The invention itself, however, both as to its organization and its method of operation, together with additional objects and advantages thereof, will best be understood from the following description of certain specific embodiments, when read in connection with the accompanying drawings in which like reference characters represent like elements and in which:

Fig. 1 is a schematic drawing of a source for an invisible wave pattern.

Fig. 2 is a schematic drawing of a system for translating an invisible wave pattern into a visible wave pattern.

Figs. 3 and 4 are detail views of finders which may be employed with the translating system of Fig. 2, or with similar translating systems.

Fig. 5 shows curves illustrating the manner in which the intensity of the light waves utilized in the translating system may be adjusted for maximum efficiency.

Fig. 1 shows a transmitting source arrangement embodying the principles of the invention which may be used on the landing field of an airport. Discharge tubes $380a$, $380b$, $380c$, $380d$, etc. of a type well known in the art may be made up in forms suitable for giving a pilot unfamiliar with the landing field the information necessary to effect a safe landing. These tubes may be positioned on the field or on an adjoining structure, as desired. The tubes may be connected in parallel or in series and excited at a suitable frequency from a single source by any of the methods described in application Serial No. 562,590, but a preferred arrangement is to employ a master oscillator 381, as shown in Fig. 1, to excite a separate power amplifier, such as 382a, 382b, 382c, 382d, etc. for each tube. The master oscillator 381 may be of the well known feed-back type and include vacuum tube 383, grid inductor 394, feed-back inductor 385, plate circuit inductor 386, plate circuit condenser 387, by-pass condenser 388, choke coil 389, direct current potential source 390, inductor 391, and variable condenser 392. Each power amplifier 382a, 382b, 382c, 382d, etc. may be any suitable type, the one shown including a vacuum tube 394, inductor 395, variable condenser 396, bypass condenser 397, choke coil 398, direct current potential source 399, inductor 400, and variable condenser 401. Potential source 399 may be employed for all amplifiers 382a, 382b, 382c, 382d, etc., or separate sources may be provided for each amplifier. The output of the master oscillator 381 is connected through conductors 402 and 403 and buss bars 404 and 405 to each amplifier 382a, 382b, 382c, 382d, etc. Each amplifier 382a, 382b, 382c, 382d, etc. may be connected to its discharge tube 380a, 380b, 380c, 380d, etc. through conductors 406a, 406b, 406c, 406d, etc.

In the operation of the system of Fig. 1, it is preferable that the frequency employed in the master oscillator 381 be one, as described in application Serial No. 562,590, that gives maximum cooperation between the radiations from the discharge tubes 380a, 380b, 380c, 380d, etc. and those from the local source in the receiving system, but, if desirable, use may be made of a radio frequency already set aside for navigational aids. Each discharge tube 380a, 380b, 380c, 380d, etc. may be excited to the desired intensity by separately adjusting the coupling between the inductors 395 and 400 and the tuning of condenser 401 in each amplifier 382a, 382b, 382c, 382d, etc. During periods of darkness and poor visibility these discharge tubes may be continuously excited to assist any airplane pilot provided with receiving apparatus employing the principles of this invention. While I have described a transmitting system particularly adapted for use with airplanes, other systems employing the same principles for other modes of navigation will be readily apparent to those skilled in the art.

Fig. 2 shows schematically the receiving apparatus which may be used to observe invisible radiations from distant light sources, such as the transmitting system of Fig. 1. It consists of a suitable viewing box 410 containing a local light source 411, which may be of the gas discharge type, excited at the desired frequency from an excitation source 412. A detail view of this viewing box is shown in vertical section in Fig. 3 which will be described first in order to permit of a better understanding of the system of Fig. 2.

Referring to Fig. 3, the radiations from the distant source, such as the transmitting system of Fig. 1, pass through a light filter 415 suitable for filtering out light waves of the same frequency as those utilized from the local light source 411 and/or of the same frequency as those obtained by scattering in the manner outlined hereinabove. Most of the radiations passing through the filter 415 may be invisible light and of the frequencies capable of penetrating fog and other atmospheric conditions. The filtered radiations are focused by a lens 416, of suitable material to pass these radiations, through a focus sharpening diaphragm 417 of the well known type onto a plate 418. In plate 418 are apertures 419a, 419b, 419c, etc. which may be round or circular holes in lines perpendicular to the plane of Fig. 3, or may be long slits along the same lines. Filtered radiations passing through the apertures 419a, 419b, 419c, etc. in beams 420a, 420b, 420c, etc. are reflected in a different direction in parallel beams 421a, 421b, 421c, etc. by parabolic reflectors 422a, 422b, 422c, etc. These reflectors may be a series of round reflectors corresponding in number to the holes of apertures 419a, 419b, 419c, etc. or may be rectangular in form in case these apertures are slits. The beams 421a, 421b, 421c, etc. are directed toward "scattering" sticks 423a, 423b, 423c, etc., which may consist of rectangular or square tubes transparent to radiations of all the frequencies utilized and containing a liquid, gas, or any substance capable of causing "scattering with change in frequency" as described in application Serial No. 562,590. The sticks 423a, 423b, 423c, etc. may also be solid sticks of a crystalline material which is capable of producing the same results. It is preferable that the beams 421a, 421b, 421c, etc. be directed normal to one face of the sticks 423a, 423b, 423c, etc. Light from the local light source 411 is brought to a parallel beam 424 by condensing lenses 425 before passing through a light filter 426 onto any suitable face of the sticks 423a, 423b, 423c, etc. The filter 426 may be of any well known type that will transmit light waves of a selected frequency, which may be visible or invisible, as outlined above. Lenses 427a, 427b, 427c, etc. may be a series of round lenses of suitable material arranged in lines perpendicular to the plane of Fig. 3, or they may be long strips of lens material with cross sections of the form shown. The lenses 427a, 427b, 427c, etc. are positioned so as to focus the maximum possible amount of light of shifted frequency from sticks 423a, 423b, 423c, etc. through a light filter 428 onto a viewing plate 429. The filter 428 may be of a type which will select light of shifted frequency in preference to that of unshifted frequency while the plate 429 may be of any material that will readily show the light passing through the filter 428, such as a fluorescent screen. A suitable hood 430 may be used for viewing the image on the plate 429.

In using the viewing box of Fig. 3, radiations from distant light sources, such as 380a, 380b, 380c, and 380d in Fig. 1, will form a similar visible light pattern on the face of plate 418. The intensities of the light beams 420a, 420b, 420c, etc. will, therefore, depend upon the intensity of the portion of the light pattern falling on the apertures 419a, 419b, 419c, etc. In case the apertures are each a series of holes, the corresponding light beams in 420a, 420b, 420c, etc. will each be of nearly uniform intensity, but if slits are used the intensities of the beams 420a, 420b, 420c, etc. will vary from one end to the other in accordance with the variations in strips of the light pattern on the plate 418. The result in either case will be that the light striking the "scattering" sticks 423a, 423b, 423c, etc. from the beams 421a, 421b, 421c, etc. will also vary along the sticks in accordance with the variations in strips of the light pattern on plate 418. The light of shifted frequency directed onto the plate 429 will vary in accordance with the light beams 421a, 421b, 421c, etc. The image obtained on the plate 429 will, therefore, consist of visible light strips varying in intensity in accordance with the invisible light pattern on the face of plate 418. It will also be in direct accordance with the distant light sources 380a, 380b, 380c, and 380d being viewed and will show their positions relative to each other. While most efficient results will be obtained in this viewing box with light sources similar to and excited in a manner similar to those shown in Fig. 1, it may be used to observe any source of invisible radiations of the necessary intensity.

Referring now to Fig. 4, a vertical section of another form of viewing box suitable for operation in the system of Fig. 2 is illustrated. In this modification no lenses are used for the invisible radiations which may be of such low frequency as to necessitate the use of quartz, or other expensive lens material. The "scattering" medium employed is a small crystalline plate which permits the observation through a lens system of the actual image of the distant light source instead of a series of light strips, as in the box shown in Fig. 3. The radiations from the distant sources, such as 380a, 380b, 380c and 380d of Fig. 1, after passing through a light filter 435 are focused by a suitable reflector 436 onto a crystalline plate 437. The plate 437 is of a material capable of producing "scattering with change in frequency" as described in application Serial No. 562,590, the light waves of shifted frequency from which are preferably coherent in nature i. e., capable of producing interference patterns. The light from the local light source 411 (see Fig. 2) is brought to a parallel beam by condenser lenses 438 and reflected by a plane reflector 439 through a light filter 440, which may be similar to and serve the same purpose as filter 426, onto a slightly convex reflector 441. The reflector 441 may spread the light beam slightly and project it through an aperture 442 in the reflector 436 onto the plate 437. Visible light of shifted frequency is reflected from the plate 437 through a light filter 443, which may be similar to and serve the same purpose as filter 428 of Fig. 3, into a suitable polarizing prism 444. The prism 444 is so placed with reference to the plate 437 and a plane reflector 445 that the light of shifted frequency from the plate 437 is polarized in a manner to permit efficient and coherent reflection from the reflector 445. The reflector 445 is preferably of the type obtained by exposing a sensitized Lippmann photographic film to light of the same frequency as the shifted frequency used from the plate 437. It has been found that, when a Lippmann film exposed in this manner has been developed, laminae are present in the film which are spaced at intervals of one half the wave length of the light to which the film was exposed. Such a film may be employed as a monochromatic light filter due to the fact that it will reflect only light of the frequency to which it was exposed. The visible light reflected from the reflector 445 permits the observation of an image of the distant invisible light sources through a fixed lens 446 and a variable objective lens 447.

Some of the reflections of shifted light frequency from the plate 437 may occur at different planes in the crystal so that interference may occur between light waves from the different planes and cause inefficient detection of the distant light source. This effect may be minimized by using an exposed Lippmann film of the type described above for the reflector 445. The light waves reflected from such a film will have less variation in their space phase with correspondingly less interference between waves and hence the image observed through the lens 447 will be more intense.

Referring now to the receiving system of Fig. 2, the local light source 411 may be excited by any of the methods described in application Serial No. 562,590, but the circuit arrangement of 412 has a number of advantages which will be enumerated below. To generate the alternating current power required for exciting the light source 411, use may be made of an oscillating circuit consisting of three or more similar sections of the type in circuit 412. This circuit is shown for convenience with three sections, the similar elements of which are designated with the suffixes "a", "b", and "c". In each of these sections a vacuum tube, such as 450a, has connected to its plate a parallel circuit containing in one branch an inductor 451a and a fixed resistor 452a and in the other branch a variable condenser 453a and a variable resistor 454a. Between this parallel circuit and the filament of the tube 450a is a by-pass condenser 455a across which may be connected a choke coil 456 and a source of direct current potential 457 both of which are common to the tubes 450a, 450b, and 450c. The filaments of these tubes may also be energized from a suitable source, such as 458. A connection from the junction between the condenser 453a and the resistor 454a is made to the grid of vacuum tube 450b with a conductor 459a. The tuning controls for condensers 453a, 453b, and 453c may be arranged in a manner well known in the art for simultaneous operation from a single point. Similarly, the controls for resistors 454a, 454b, and 454c may be arranged for simultaneous operation from another point.

The inductors 451a, 451b, and 451c are symmetrically positioned with respect to an inductor 461 which is connected to the light source 411 through a variable condenser 462, a variable resistor 463, and conductors 464. The inductor 461 is wound on a form 466 mounted on a shaft 467 which may be rotated by means of a knob 468. A pointer 469 and a dial 470 serve to indicate the position of the inductor 461 with reference to the inductors 451a, 451b, and 451c.

In the circuit 412 no tube will oscillate by itself since each tube depends upon voltage from the plate circuit of the preceding tube for the excitation of its grid. For steady oscillations, it is therefore desirable to adjust the phase between the alternating voltage on the plate of one tube and the alternating voltage on the grid of the tube connected to it to a certain definite value. It can be shown that in the case of a three section oscillator this phase difference is 60 degrees, while with more sections the differences are less and would be only 30 degrees for a six section oscillator. The desired phase shift is obtained by the addition of the resistors 452a and 454a to the common form of plate circuit which would include only the inductor 451a and the condenser 453a. The alternating voltage impressed on the grid of tube 450b is the voltage across the resistor 454a which may be 60 degrees out of phase with the alternating voltage between the plate of tube 450a and the condenser 455a. This phase may be adjusted to a limited extent by the resistor 454a.

In the preferred use of the receiving system of Fig. 2, the circuit 412 would be tuned by means of condensers 453a, 453b, and 453c to the same frequency as the excitation source of the lights to be observed, such as the system of Fig. 1.

The resistors 454a, 454b, and 454c may then be adjusted so that steady alternating fields are set up in the inductors 451a, 451b, and 451c. Because the currents in these inductors are 120 degrees out of phase with each other, the effect of their combined fields is such that the voltage induced in the inductor 461 can be shifted through 360 degrees by turning the knob 468 through the same angle. The voltage induced in the inductor 461 excites the local light source 411, the exciting current being adjusted to the desired value by means of the condenser 462 and the resistor 463.

It will be found that in turning the knob 468 the intensity of the visible image seen in the viewing box 410 will change and that at a particular position of the knob the image will be of maximum intensity. This is due to the difference in distance of the local light source 411 and the distant sources, such as 380a, 380b, 380c, and 380d, from the "scattering" medium which may be "scattering" sticks 423a, 423b, 423c, etc.

The voltage impressed on the local light source 411 through the inductor 461 may vary with time in accordance with curve $a$ of Fig. 5. The intensity of the light emitted by source 411 may then vary in accordance with curve $b$. There will be one pulse of light for each half cycle of the voltage wave $a$. The distant light sources, such as 380a, 380b, 380c, and 380d of Fig. 1, may also be excited through the amplifiers 382a, 382b, 382c, and 382d by voltages varying in accordance with curve $a$. If the exciting voltages of the local light source and of the distant light sources are of equal amplitude, of the same frequency, and in the same phase relationship, the light pulsations emitted by the local source and by the distant sources may all vary in accordance with curve $b$.

Light waves from the local and distant sources will travel at the well known velocity of light, which will be designated $s$. The local source may be located so that the time of travel to the "scattering" medium is negligible. The distant sources, however, may be far enough away to make the time of travel comparable with half the period of the exciting voltage, or $t_1-t_0$. The peak of light intensity occurring at a time $t$ may not reach the "scattering" medium until the time $t_1$, as shown in curve $c$. During the time of travel $t_1-t$, the light from the local source may have reached its minimum value, as shown in $b$. The maximum effect on the "scattering" medium of light from the distant sources will then occur when there is no light from the local source and the image of visible frequency on the plate 429 may be of extremely low intensity. This undesired effect may be overcome by adjusting the excitation phase of the local light source so that its maximum intensity occurs at time $t_1$ instead of at $t$. The light waves reaching the "scattering" medium from both the local light source and the distant light sources will then have maximum intensity simultaneously and the image on the plate 429 will be of maximum intensity. The phase adjustment necessary to accomplish this result may be obtained by turning the knob 468, two points of optimum adjustment being possible for each complete revolution of the knob 468.

It is well known in the art that with the excitation frequencies employed in this invention visible light pulses corresponding to curve $b$ would appear as a steady light to the eye. The image seen on the viewing plate 429 will also appear as a continuous light.

In some uses of the receiving system of Fig. 2, the observer may be moving too rapidly with reference to the stationary light source to permit maintaining the image seen in viewing box 410 at maximum intensity by means of the knob 468. This objection may be overcome by adjusting the resistors 454a, 454b, and 454c so that the phase difference between the plate and grid voltages of adjacent tubes is slightly greater or less than 60 degrees. This will cause the currents in inductors 451a, 451b, and 451c to be more or less than 120 degrees out of phase so that their combined effect will be that of a revolving field through the inductor 461. The speed of revolution of this field will depend upon the amount of phase change caused by the resistors 454a, 454b, and 454c. If this change is great, the speed will be high, and if small, the speed will be low. Twice every revolution an image of maximum intensity will be obtained in the viewing box 410 so that by making the speed of revolution high enough practically a continuous image may be observed.

The adjustment afforded by the knob 468 furnishes a means for determining the distance between the transmitting source and the receiving system. By synchronizing the oscillations in the receiving oscillator 412 with the oscillations in the transmitter oscillator, such as 381 of Fig. 1, and maintaining a non-rotating alternating field through the inductor 461, the angle through which the pointer 469 must be turned in order to keep an image of maximum intensity in the viewing box 410 will furnish a means for determining the distance between the two systems.

Assume that it is necessary to turn the pointer 469 through an angle $\phi$ and that this change moves the light peak of the local source from $t$, as shown at $b$ in Fig. 5, to $t_1$, as shown at $c$. The time interval $t_1-t$ will then indicate the time required for the light waves to travel from the distant source to the receiver. This period may be some fraction $n$ of $t_1-t_0$, the time of one light pulse, and the distance traveled $$l = s(t_1-t) = ns(t_1-t_0) \tag{1}$$

The period of the exciting voltage, as shown at $a$, is given by the equation $$t_2-t_0 = 2(t_1-t_0) = \frac{\lambda}{s} \tag{2}$$

where $\lambda$ is the length of the light exciting radio wave. Substituting equation (2) in (1) we have $$l = n\frac{\lambda}{2} \tag{3}$$

The angle $\phi$ may be proportional to the time period $t_1-t$ and since the period $t_1-t_0$ corresponds to $\phi=180°$, the relation for any value of $n$ will be $$\phi = n\ 180° \tag{4}$$

Substituting (4) in (3) we have $$l = \frac{\phi}{360}\lambda \tag{5}$$

To determine $\phi$ it is necessary to know the position of the pointer 469 when $l=0$. This may be obtained by placing the receiver in close proximity to one of the distant light sources and adjusting with the knob 468. For other distances $\phi$ may be measured from this zero position.

From Equation 3 it is seen that the distances measured will be in terms of half wave lengths and fractions thereof. Direct measurements may be possible only for distances up to $$\frac{\lambda}{2}$$

since for each adjustment giving $\phi$ between 0° and 180° there will be another satisfactory adjustment at $\phi+180°$. The use of the system is not confined, however, to measurements up to $$\frac{\lambda}{2}$$

since means are available for determining the number of half wave lengths in $l$.

In the case of an airplane, the proper setting for the pointer 469 may be continuously observed as the airplane rises from the light source on the ground. The number of times this setting changes by 180° may be noted and the corresponding number of half wave lengths added to the distance indicated by the dial 470. At considerable elevation a comparison may be made by checking with an instrument indicating only the approximate elevation, such as a barometer.

The preferred method in this invention for determining the number of half wave lengths in $l$ is to place on the plate 429 a linear scale which may be either arbitrarily selected or specially made for use with an observable object of a certain length. According to the well known laws of optics, the length of the visible image on the plate 429 will be to the length of the observable object directly as their distances from the center of the lens 416. Since the distance from the image on plate 429 to the lens 416 is fixed, it can be shown mathematically that for an object of a given length the length of the image on plate 429 will be inversely proportional to the distance from the object to the lens 416. Through suitable calibrations, the length of the image, determined by the scale on plate 429, may be used to indicate this distance $l$. This method would be particularly effective in an airplane, since maximum use of the system would be made when $l$ is small and the image large.

The selection of a wave length for the oscillators 381 and 412 may depend on the distances to be measured, the accuracy of measurement required, and the dependence to be placed on auxiliary measuring equipment. The use of a 10,000 meter wave would permit direct measurements up to 5000 meters, but with very little accuracy over short distances. A 1000 meter wave would measure directly up to 500 meters with fair accuracy. A 100 meter wave would give extreme accuracy, but for distances over 50 meters would require dependence on auxiliary measuring equipment.

In some cases the information desired may be the distance between successive positions of the receiver. The angle $\phi$ may then be the angle between positions of the pointer for the two points of observation. By timing the travel between points of observation, the speed of travel toward the ground may also be determined.

While the voltage variation indicated at $a$ in Fig. 5 is shown as sinusoidal, it will be understood that more accurate measurements of distance may be possible with an extremely peaked wave form. For this purpose, therefore, it may be preferable to use one of the excitation methods described in application Serial No. 562,590.

Many modifications of my improved invisible light finder will be apparent to those skilled in the art and my invention, therefore, is not to be restricted to the specific embodiments chosen for purposes of illustration, but is to be limited only by the scope of the appended claims.

What I claim is:

1. In a system for viewing an invisible wave pattern, a local wave source, means for changing the length of at least a portion of the waves from said source, means for directing the waves from said invisible pattern on said changing means for intensifying at least a portion of said waves of changed length, and means separating said waves of changed length from said local waves for observing said intensified waves in accordance with said pattern of said invisible waves.

2. A viewing system in accordance with claim 1 in which said changing means is a crystalline plate capable of scattering with change in frequency the waves from said local source.

3. In a navigational system, a plurality of sources of light waves located within a certain area, a craft, means within said craft for generating light waves of a definite frequency, means for scattering said last mentioned light waves with change in frequency, means for intensifying said light waves with said light waves of changed frequency from said area, and means actuated by said intensified waves for simultaneously observing the relative positions of said sources in said area.

4. In a navigational system, a plurality of sources of light waves located within a certain area, a craft, means within said craft for generating light waves of a definite frequency, means for scattering said last mentioned light waves with change in frequency, means for intensifying said light waves with said light waves of changed frequency from said area, means actuated by said intensified waves for simultaneously observing the relative positions of said sources in said area, and means for indicating the distance from said craft to said sources.

5. In an airport marking system, a plurality of fog penetrating light wave sources positioned on said airport, means for energizing said sources at a high frequency, and means mounted on an airplane for observing said sources, said observing means comprising a local source of light waves scattered with change in frequency and means actuated by the intensification of said waves of changed frequency by said fog penetrating waves for simultaneously observing the relative positions of said first sources.

6. The method of producing images of objects through a medium impenetrable by visible light waves comprising scattering light waves with change in frequency at an observing position, forming a visible uniform light field with said waves of changed frequency, and intensifying portions of said field with penetrable waves from said objects.

7. In a navigational system, a plurality of light discharge tubes positioned in definite relationship at a distant point, an oscillator, a plurality of amplifiers for said oscillator separately exciting said tubes, a medium for scattering light with change in frequency, means for focusing light waves from said tubes on said medium, a local light discharge tube, a second oscillator, means for exciting said local tube with said second oscillator, means for directing light waves from said local tube on said medium, and means for observing a field of visible light waves of shifted frequency from said medium, said field varying in intensity throughout in direct accordance with said positions of said first discharge tubes.

8. In a navigational system, a source of pulsating light vibrations at a distant point, means for detecting the time of maximum intensity of said vibrations received at another point, said means designating settings for said times of maximum intensity at different positions of said means from said distant point, and means for determining the variation between said settings, said settings being an indication of the distance between said distant and said setting points and said variation being an indication of the distance traveled by said detecting means toward and away from said distant point between settings.

9. The method of measuring the distance between separated stations comprising projecting light waves of pulsating intensity from one of said stations, generating light waves of a different frequency at the receiving station, setting up in said second light waves intensity pulsations of the same frequency as said first pulsations, shifting the frequency of at least a portion of said second light waves, increasing the intensity of said shifted light waves with said first light waves, adjusting the phase between the pulsations of said first light waves and the pulsations of said second light waves to obtain maximum intensity of said shifted light waves, and determining the phase difference between said pulsations.

10. In combination, an oscillator, a light discharge tube, means for energizing said tube with said oscillator at a particular frequency, a second oscillator, a second light discharge tube, means for energizing said second tube with said second oscillator at substantially the same frequency as said first tube, means for directing light waves from said first tube and from said second tube on a light scattering medium, and means for adjusting said second energizing means to periodically vary the phase between the energization of said first and said second tubes.

11. In combination, a light discharge tube, an oscillator, means for energizing said tube with said oscillator, a medium for scattering light with change in frequency adapted to be positioned at different distances from said tube, means for directing light waves from said tube on said medium, a second light discharge tube at a fixed distance from said medium, a second oscillator, means for energizing said second tube from said second oscillator, means for directing light waves from said second tube on said medium, means for detecting light waves of shifted frequency projected from said medium, and means for adjusting said second energizing means to continuously vary the phase between the energization of said first and of said second tubes, said phase variation causing periodic intensity variations of said shifted waves irrespective of the said different distances of said medium from said first discharge tube.

12. In a navigational system, a source of light vibrations at a distant point, means at another point for translating said vibrations into observable vibrations, means for adjusting said observable vibrations to maximum intensity, the adjustment of said adjusting means for maximum intensity varying according to the distance of said translating means from said distant point, means separate from said adjusting means causing periodic pulsations of said observable vibrations irrespective of the distance of said translating means from said distant point.

13. In an invisible light finder, a medium for scattering light with change in frequency, a local light discharge tube, means for energizing said tube, means for directing light waves from said tube on said medium, means for focusing an invisible light pattern on said medium, and means for observing a visible light pattern of shifted frequency from said medium, said observed pattern varying in accordance with said invisible pattern.

14. In an invisible light finder, a medium for scattering light with change in frequency, a local light discharge tube, means for energizing said tube at a high frequency, means for directing light waves from said tube on said medium, means for focusing an invisible light pattern on said medium, means for observing a visible light pattern of shifted frequency from said medium in accordance with said invisible pattern, and means for changing the time of maximum energization of said tube.

15. In a light detection system, means for focusing invisible light waves from distant sources, means for separating said focused waves into a plurality of light beams, a plurality of mediums for scattering light with change in frequency, means for directing said light beams on said mediums, a local light discharge tube, means for energizing said tube, means for directing visible light waves from said local tube on said mediums, an observing plate, and means for focusing light waves of shifted frequency from said mediums on said plate, said focused light waves of shifted frequency varying in intensity on said plate in direct accordance with said focused invisible waves.

16. In an invisible light finder, a plurality of elements for scattering light with change in frequency, a local light discharge tube, means for energizing said tube, means for directing light waves from said tube on said elements, means for focusing an invisible light pattern, means for changing said focused pattern to a plurality of light beams, means for directing said beams on said elements, and means for observing a visible wave pattern of shifted frequency from said elements, said visible waves varying on said elements in accordance with the intensities of said beams, and said observed pattern varying in accordance with said invisible pattern.

17. In an invisible light finder, a plate for scattering light with change in frequency, a local light discharge tube, means for energizing said tube, means for directing light waves from said tube on said plate, means for focusing an invisible light pattern on said plate, and means for observing a visible light pattern of shifted frequency from said plate, said observed pattern varying in accordance with said invisible pattern.

18. In an invisible light finder, a plate for scattering light with change in frequency, a local light discharge tube, means for energizing said tube, means for directing light waves from said tube on said plate, means for focusing an invisible light pattern on said plate, means for filtering out incoherent waves of shifted frequency from said plate, and means for observing a visible light pattern of said shifted frequency from said plate, said observed pattern varying in accordance with said invisible pattern.

19. In an airport landing system, an oscillator, a plurality of pattern forming discharge tubes mounted on an airport, means for energizing said tubes with said oscillator, a local light discharge tube mounted on an airplane, a second oscillator, means for energizing said local tube with said second oscillator, a medium for scattering light with change in frequency, means for directing light waves from said pattern forming tubes and from said local tube on said medium, means for observing light waves of shifted frequency from said medium in direct accordance with said pattern, and means associated with said second energizing means for indicating the distance from said airplane to said airport.

20. In an invisible light finder, a medium for scattering light with change in frequency, a local light discharge tube, means for energizing said tube, means for directing light waves from said tube on said medium, means for focusing an invisible light pattern on said medium, means for polarizing visible light of shifted frequency from said medium, and means for observing a visible polarized light pattern of said shifted frequency from said medium, said visible pattern corresponding to said invisible pattern.

21. In a light viewing system, a plurality of successive oscillators having input and output circuits, phase adjusting connections between each of said output circuits and said input circuit of said next successive oscillator, a light discharge tube, and means variably coupled to at least one of said output circuits for energizing said tube.

22. In a light viewing system, a plurality of successive oscillators having input and output circuits, phase adjusting connections between each of said output circuits and said input circuit of said next successive oscillator, means for simultaneously varying said adjusting connections, a light discharge tube, and means variably coupled to at least one of said output circuits for energizing said tube.

23. The method of producing images of objects through a medium impenetrable by visible light waves comprising directing penetrable waves of varying intensity from said objects on a uniform field of visible light waves and shifting the frequency of at least a portion of said visible light waves, said penetrable waves intensifying said waves of shifted frequency in accordance with said varying intensity.

24. The method of producing images of objects through a medium impenetrable by visible light waves comprising directing penetrable waves of varying intensity from said objects on a uniform field of impenetrable light waves, shifting the frequency of at least a portion of said impenetrable waves to form a field of visible frequency, and making visible variations in said second field in accordance with said varying intensity.

25. The method of producing images of objects through a medium impenetrable by visible light waves comprising directing penetrable waves of varying intensity from said objects on uniform fields of superimposed light waves of different frequencies, shifting the frequency of at least one of said fields to a plurality of frequencies, and selecting at least one of said fields of shifted frequency, said selected field varying in intensity in accordance with said intensity of said penetrable waves.

26. In combination, a plurality of pattern forming light sources, means causing said sources to emit impulses of invisible light waves, a different light source at a distant point, means causing said different source to emit visible light waves in corresponding impulses, means for scattering said visible waves with change in frequency, and means actuated by the intensification of said waves of changed frequency by said invisible waves for observing said pattern at said distant point.

27. In an invisible light finder, a medium for scattering light with change in frequency, a local light discharge tube, means for energizing said tube, means for directing light waves from said tube on said medium, means for focusing an invisible light pattern on said medium, and means for improving the observation of a visible light pattern of shifted frequency from said medium, said observed pattern varying in accordance with said invisible pattern.

28. In combination, a source of wave vibrations of a particular frequency at a distant point, means for energizing said source at a second frequency, a second source of wave vibrations adapted to be positioned at other points, means for energizing said second source at said second frequency, said second energizing means including means for adjusting the time phase between the energization of said first and said second sources, means actuated by said first and said second wave vibrations to produce additional wave vibrations, said actuated means being maintained at a fixed distance from said second source, and means for determining the intensity of said additional wave vibrations, said adjusting means designating different settings for maximum intensity of said additional wave vibrations and said settings being an indication of the distances between said distant and said other points.

29. In combination, a source of wave vibrations of a particular frequency at a distant point, means for energizing said source at a second frequency, a second source of wave vibrations adapted to be positioned at other points, means for energizing said second source at said second frequency, said second energizing means including means for adjusting the time phase between the energization of said first and said second sources, means actuated by said first and said second wave vibrations to produce additional wave vibrations, said actuated means being maintained at a fixed distance from said second source, means for determining the intensity of said additional wave vibrations, said adjusting means designating settings for maximum intensity of said additional wave vibrations at different distances of said other points from said distant point, and means for determining the variation between said settings at two of said other points collinear with said distant point, said variation being an indication of the distance between said two points.

30. In combination, a source of wave vibrations of a particular frequency at a distant point, means for energizing said source at a second frequency, a second source of wave vibrations at another point, means for energizing said second source at said second frequency, said second energizing means being adjustable for periodic variation of the time phase between the energization of said first and said second sources, means actuated by said first and said second wave vibrations to produce additional wave vibrations, and means for determining the intensity of said additional wave vibrations, said periodic variation causing periodic intensity variations of said additional wave vibrations irrespective of the distance traveled by said first wave vibrations between said distant and said second point.

31. The method of producing images of objects through a medium impenetrable by visible light waves comprising uniformly shifting to an observable visible frequency a portion of local light waves and impressing waves penetrating through said medium from said objects on said local light waves, the intensity of said waves of shifted frequency varying in accordance with the intensity of said penetrable waves emanating from said objects to form an image thereof.

32. The method of directly viewing an object invisible to the eye because of mist, fog, or darkness comprising generating light waves with an observation medium, said light waves having at least one component thereof in the visible spectrum discernible by an observer, and impressing wave radiations from the object to be viewed on said medium, said radiations intensifying said generated visible component in accordance with the intensity of said impressed radiations to form an image of said object.

HERMAN POTTS MILLER, Jr.